Nov. 30, 1971 W. SHRINER 3,623,295
AIR POLLUTION REDUCTION SYSTEM
Filed March 23, 1970

Inventor.
Walter Shriner
Elmer L. Zwickel
Atty.

United States Patent Office 3,623,295
Patented Nov. 30, 1971

3,623,295
AIR POLLUTION REDUCTION SYSTEM
Walter Shriner, 1133 S. 2nd St., Springfield, Ill. 62704
Continuation-in-part of application Ser. No. 828,080, May 2, 1969, now Patent No. 3,587,210. This application Mar. 23, 1970, Ser. No. 21,914
Int. Cl. B03c 3/30
U.S. Cl. 55—103                                    1 Claim

ABSTRACT OF THE DISCLOSURE

An air pollution reduction system embodying elongated dielectric means to induce electrostatic forces in the path of a polluted fluid stream to cause maximum precipitation of solids in said stream, and the collection of such solids.

---

This application is a continuation-in-part of my copending application, Ser. No. 828,080, filed May 2, 1969, now Pat. No. 3,587,210.

The invention relates to an air pollution reduction system and is more particularly concerned with such a system wherein the removal of particulate and chemical pollutant contents of a fluid stream is obtained by the collection of said particulate matter in an entrapment zone after said stream has undergone precipitation of such matter through activation of an electrostatically charged field generated from grids having high dielectric properties arranged in the path of said stream enroute to said entrapment zone.

Very fine colloidal particles which are discharged with a stream of exhaust gases emitted from, for example, internal combustion engines of automobiles, are especially conducive to the formation of smog conditions. Accordingly, coalescence of said colloids and fine particulate suspended material, so as to facilitate the entrapment thereof before stream discharges to the atmosphere, is of great significance in reducing smog producing conditions.

In former systems devised for separating and collecting solid and liquid pollutants suspended in a moving gas stream, an electrical field was generated within a chamber or enclosure by a perforated dielectric wall through which said gases flowed to cause precipitation of said particles and to thereafter collect said particles in an entrapment zone.

The present invention incorporates novel improved means whereby the colloidally suspended pollutant particles of the pollutant carrying fluid stream initially encounters a novel electrostatically charged field or zone. The electrostatic charges applied to said particles in the fluid stream are intensified by means of the elongation of the charged field through which the fluid stream passes enroute to an entrapment or collection zone. Said field defines an elongated coalescence zone to produce maximum coalescence of electrostatically charged particles contained in the stream prior to entering said collection zone.

Specifically, the system includes a series of shallow entrapment or collection zones through which the fluid stream ultimately passes. Said zones are defined by units fabricated from high density plastic in which there is provided, in advance of the collection zones, a series of tubular passageways of considerable length. The units may constitute a thin plastic structure and they embody many relatively long frictionally chargeable plastic surfaces having associated therewith a metal screen and entrapment zone.

It is therefore an object of the invention to provide a pollution reduction system of the character herein described.

Another object is to cause precipitation of particulate matter in a fluid stream by altering the electro-colloidal state of such particulate matter.

Another object is to provide an air pollution reduction device having a maximum number of large electrostatic generating areas or surfaces.

Another object is to provide, in an anti-pollution device, a structural configuration designed to reduce back pressure to a minimum.

Another object is to provide a device of the character referred to with nominal size collection zones.

Another object is to provide a multi-unit assemblage comprised of a plurality of like units each containing tube-like electrostatic generating areas through which a pollutant laden fluid stream is flowed.

Another object is to enhance the frictional charge generating capabilities of an exhaust gas traversing a multitubular plastic unit and to utilize the same gas as a charge carrying means.

Another object is to produce the subsequent neutralization of colloidally charged particles and to induce their precipitation in a solid or liquified mass.

Another object is to provide a novel self-contained air pollution reduction device for ready association with the exhaust system of an internal combustion engine or the like.

Another object is to provide a pollution reducing system that is useful in other fields than the automotive field, such as smoke stacks and the like.

Another object is to provide a series of like units fabricated from high density plastic joined in a stacked relation in alignment with the flow path of a fluid stream, wherein each of said units is provided with a multitude of tubular flow passageways.

Another object is to provide a system of the character referred to that is relatively inexpensive to manufacture and install and which will require but minimum care and maintenance.

Other objects and advantages of the invention will become apparent with reference to the following description and accompanying drawings.

Figure 1:
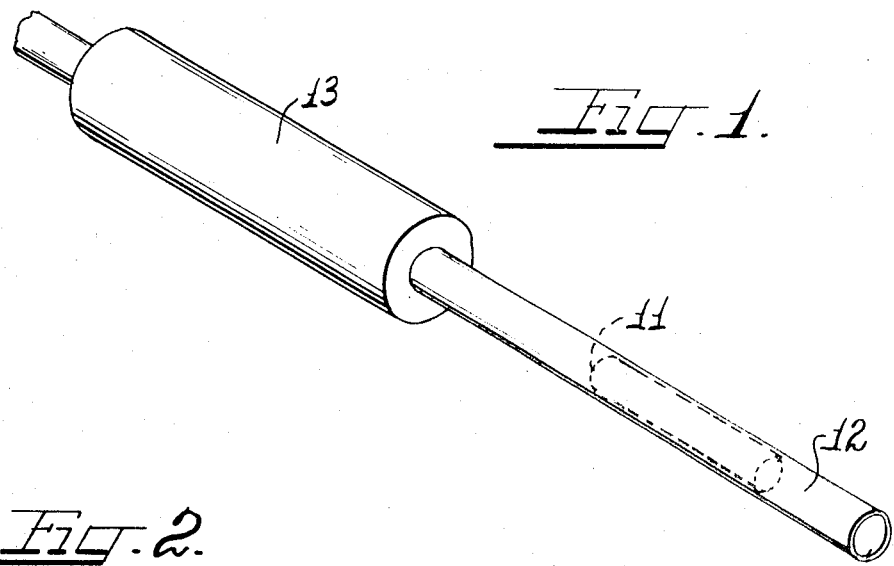
FIG. 1 is a perspective view of an exemplary exhaust system of an internal combustion engine having the anti-pollution device installed therein.
Figure 2:
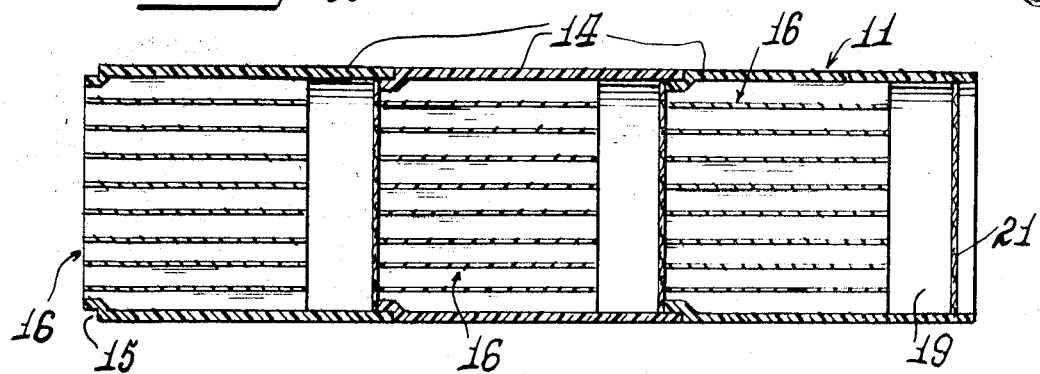
FIG. 2 is a longitudinal sectional view of the device.

As shown in FIG. 1 of the drawings, an air pollution reduction device 11, incorporating the features of this invention, is shown as occupying a position in the tail pipe 12 of a typical exhaust system having a muffler 13 to which the tail pipe 12 is joined in upstreamward relation to device 11. Accordingly, when a stream of exhaust gases reaches the device 11, much of the heat and pulse wave of such gases are absorbed during passage through muffler 13. This allows for miniaturizing the overall size of the device 11, as compared with one that would be required under conditions where the gases entered the device 11 at close to sonic velocities and maximum temperatures, with consequent loss in the operating efficiency of the device 11.

As shown, the device 11 comprises a cylindrical body open at both ends. The body is made of high heat resistant plastic of a type which affords electrical resistance to the pollutant components contained in the exhaust gases. Although it may be of one piece, the body preferably is comprised of a series of like tubular units 14 of suitable size and shape joined together in a rigid stacked assembly along a line extending lengthwise of the line of travel of the fluid stream with which it is operatively associated.

The series of tubular units may be assembled in a metallic sleeve or may be inserted directly into the tail pipe 12 in downstream relation to the muffler 13.

Each unit 14 is preferably comprised of a body molded or otherwise formed of high temperature-resistant synthetic resinous composition such as, for example, phenolic resins or acrylic polymers. Preferably, the front end of each unit is of reduced transverse outside dimension so as to provide an inwardly offset neck 15 about which the rear end of a unit 14 forwardly thereof has an external telescopic fit. The joint may be cemented or otherwise made secure and the number of such units joined together may be varied to suit requirements of the particular installation.

Figure 3:
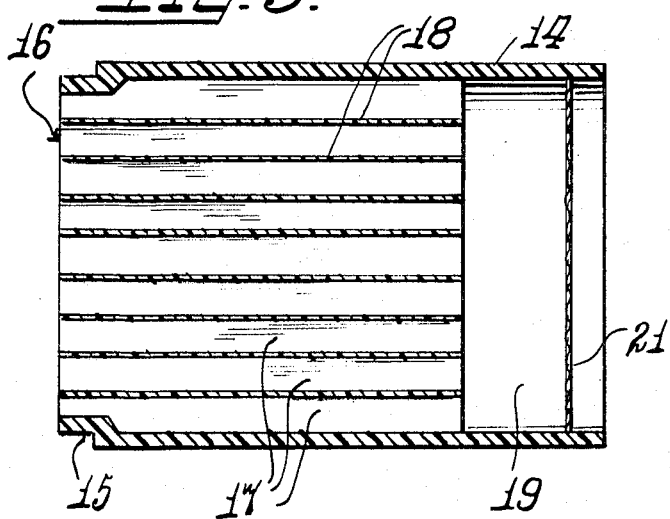
FIG. 3 is an enlarged longitudinal sectional view of one of the several units making up the device.
Figure 4:
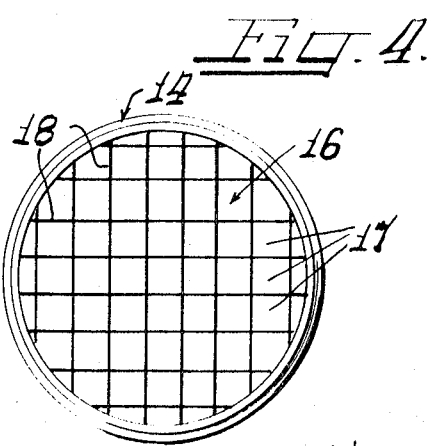
FIG. 4 is an elevational view of the upstream end of the unit shown in FIG. 3.

As best shown in FIGS. 3 and 4, each unit 14 is formed on its interior with a grid 16 comprised of a plurality of longitudinally elongated tubular passageways 17 formed by thin division walls 18. These tubular passageways 17 extend from the front or upstream end of the unit to a point short of the back or downstream end thereof so as to leave a turbulence or collection zone 19 rearwardly of the grid. The grid is shown as comprised of square tubular passageways but it is to be understood that these passageways can be round, oval or of other practical shape.

This type of unit permits substantial free flow of the exhaust gas or fluid stream from the upstream end back into the collection zone 19 with minimum back pressure. Because the material of the grid 16 is also of high temperature-resistant synthetic resinous dielectric material there is an electrical field generated by the friction of the fluid stream passing through the passageways. Under this condition, the particulates of contaminated or pollutant material carried in the flow stream encountering said electrostatically conditioned field becomes charged so as to coalesce the colloidal particles and render same susceptible of entrapment in the collection zone 19. The extended length of the tubular passageways 17 affords a very large frictionally chargeable plastic surface as compared with known prior devices.

Collection of the contaminate material precipitated is accomplished in the turbulence or collection zone 19 which has a copper or aluminum screen 21 across the back or downstream end thereof. As the fluid stream moves from unit to unit during its downstream flow, the colloidal effluent remaining in the fluid stream discharging from one unit into the next adjacent unit will undergo further electrostatic action in each succeeding unit with the result that the fine particle size at the output end of the most downstream positioned unit 14 will result in substantially total agglomeration of the particles in relation to the condition of such particles at the most upstream positioned unit 14.

Once the surface of the tubular passageways have been activated by the flow of the hot fluid stream therethrough, the walls thereof ultimately become charred. However, the char-surface functions uninterruptedly until the entire wall 18 of the tubular passageways have been eroded away. Experiments have established that such eroding does not occur for many months of continuous use after which time the device can be replaced.

I claim:
1. An air pollution reduction device for placement in the path of a pollutant loaded stream of hot gases comprising, in combination, an elongated tubular body having an open gas inlet end and an open gas outlet end, said body being comprised of a series of like tubular units axially arranged and nested one into the other end to end, a grid of dielectric plastic material bridging the upstream end of each unit, said grids comprising an overall pattern of elongated tubular passageways extending lengthwise of the tubular units and through which gases must flow, said passageways being of such length as to extend from the gas inlet end to short of the gas outlet end, and a mesh screen spaced from the downstream end of the passageways and located at the gas outlet end to define between said passageways and screen a collection chamber.

References Cited
UNITED STATES PATENTS

| | | | |
|---|---|---|---|
| 1,793,665 | 2/1931 | Anderson | 55—155 X |
| 2,114,682 | 4/1938 | Gumaer | 55—103 X |
| 2,758,666 | 8/1956 | Prentiss | 23—209.9 X |
| 2,847,082 | 8/1958 | Roos | 55—132 |
| 2,973,054 | 2/1961 | Kurtz | 55—131 |
| 3,091,069 | 5/1963 | Brasefield | 55—5 |
| 3,257,779 | 6/1966 | Strubler | 55—123 |
| 3,394,707 | 7/1968 | Ellis | 131—264 X |
| 3,493,109 | 2/1970 | Carta et al. | 209—127 X |
| 1,407,311 | 2/1922 | Witte | 55—124 |
| 1,532,730 | 4/1925 | Chalupa et al. | 55—485 X |
| 2,180,119 | 11/1939 | Osterloh et al. | 55—418 X |
| 2,297,601 | 9/1942 | Williams | 55—132 |
| 2,376,933 | 5/1945 | Moran | 55—485 X |
| 2,443,780 | 6/1948 | Wintermute | 55—138 X |
| 2,492,493 | 12/1949 | Misson | 310—7 X |
| 2,579,441 | 12/1951 | Palmer | 55—131 |
| 2,593,377 | 4/1952 | Wintermute | 55—124 X. |
| 2,712,858 | 7/1955 | Wintermute | 55—125 |
| 2,778,443 | 1/1957 | Yereance | 55—103 X |
| 2,785,768 | 3/1957 | Gauchard | 55—103 X |
| 2,853,150 | 9/1958 | Lenehan | 55—101 |
| 3,054,553 | 9/1962 | White | 310—5 UX |
| 3,386,580 | 6/1968 | Grabarczyk | 55—485 X |
| 3,396,515 | 8/1968 | Wright | 55—485 X |
| 3,527,235 | 9/1970 | Fidelman | 131—264 |

FOREIGN PATENTS

| | | | |
|---|---|---|---|
| 792,068 | 3/1958 | Great Britain | 55—103 |
| 421,186 | 12/1910 | France | 55—485 |
| 1,302,759 | 7/1962 | France | 131—262 B |
| 922,730 | 4/1963 | Great Britain | 55—128 |

DENNIS E. TALBERT, JR., Primary Examiner

U.S. Cl. X.R.

55—128, 131, 138, 146, 154, 319, 418, 485; 60—29; 131—262 B; 181—46, 56